(12) United States Patent
Lau et al.

(10) Patent No.: US 7,257,586 B2
(45) Date of Patent: *Aug. 14, 2007

(54) DATA RANKING WITH A LORENTZIAN FUZZY SCORE

(75) Inventors: Yun-Tung Lau, Bethseda, MD (US); Marton Nagy, Oakton, VA (US)

(73) Assignee: Science Applications International Corporation, San Diego, CA (US)

(*) Notice: Subject to any disclaimer, the term of this patent is extended or adjusted under 35 U.S.C. 154(b) by 502 days.

This patent is subject to a terminal disclaimer.

(21) Appl. No.: 10/745,552

(22) Filed: Dec. 29, 2003

(65) Prior Publication Data

US 2004/0139068 A1 Jul. 15, 2004

Related U.S. Application Data

(63) Continuation of application No. 09/952,518, filed on Sep. 12, 2001, now Pat. No. 6,701,312.

(51) Int. Cl.
*G06F 17/30* (2006.01)
(52) U.S. Cl. .................................................. 707/100
(58) Field of Classification Search ............... 707/1, 707/2, 100, 7, 10, 9; 709/203
See application file for complete search history.

(56) References Cited

U.S. PATENT DOCUMENTS 5,983,220 A 11/1999 Schmitt .................. 707/5
6,070,160 A 5/2000 Geary ..................... 707/4
6,202,060 B1 3/2001 Tran ....................... 707/3
6,243,713 B1 6/2001 Nelson et al. ........... 707/104.1
6,701,312 B2* 3/2004 Lau et al. ................ 707/5
7,076,487 B2* 7/2006 Liechty et al. .......... 707/7

OTHER PUBLICATIONS

"Fuzzy Logic" [online], Copyright 199 [retrieved on Jul. 3, 2001], pp. 1-7, Retrieved from the Internet: http://www.attar.com/pages/fuzzy.htm.
Simon, Dan, "Fuzzy Filtering" [online], Mar. 13, 2001 [retrieved on Jul. 3, 2001], pp. 1-5, Retrieved from the Internet: http://www.innovatia.com/software/papers/fuzzy.htm.
"Fuzzy Logic Research and Life" [online], May 1993 [retrieved on Jul. 3, 2001], pp. 1-2, Retrieved from the Internet: http://itri.loyola.edu/kb/c5_s4.htm.
"Integration of Problem-Solving Techniques" [online[, May 1993 [retrieved on Jul. 3, 2001], Retrieved from the Internet: http://itri.loyola.edu/kb/c6_s3.htm.

(Continued)

*Primary Examiner*—Etienne P LeRoux
(74) *Attorney, Agent, or Firm*—Kilpatrick Stockton LLP

(57) ABSTRACT

The present invention relates to a method for searching a document database such as the Internet and ranking the results obtained from such a search. The invention also relates to ranking of a set of numerical data according to a set of user specified preferences, including target range, fuzziness and bias. A fuzzy score is calculated for each database record satisfying a query and the results ranked according to fuzzy score. The fuzzy score is calculated using a Lorentzian fuzzy score formula.

13 Claims, 11 Drawing Sheets a=5 and x0=0

300

OTHER PUBLICATIONS

"Why Use Fuzzy Logic?" [online], Copyright 1996-2000 [retrieved on Jul. 3, 2001], pp. 106, Retrieved from the Internet: http://www.aptronix.com/fide/whyfuzzy.htm.

"What is Fuzzy Logic?" [online], Apr. 15, 1993 [retrieved on Jul. 3, 2001], pp. 1-4, Retrieved from the Internet: http://www.cs.cmu.edu/web/Groups/AI/html/faqs;ai/fuzzy/part1/faq-doc-2.html.

"Where is Fuzzy Logic Used?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-3.html.

"What is a Fuzzy Expert System?" [online], Apr. 21, 1993 [retrieved on Jul. 3, 2001], pp. 1-5, Retrieved from the Internet: http://www.cs.cmu.edu/web/Groups/AI/html/faqs/ai/fuzzy/part1/faq-doc-4.html.

"Where are Fuzzy Expert Systems Used?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-5.html.

"What is Fuzzy Control?" [online], Mar. 17, 1995 [retrieved on Jul. 3, 2001], pp. 1-2, Retrieved from the Internet: http://www.cs.cmu.edu/web/Groups/AI/html/faqs/ai/fuzzy/part1/faq-doc-6.html.

"What are Fuzzy Numbers and Fuzzy Arithmetic?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-7.html.

"Isn't 'Fuzzy Logic' an Inherent Contradiction? Why Would Anyone Want to Fuzzify Logic?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-8.html.

"How Are Membership Values Determined?" [online], Apr. 15, 1993 [retrieved on Jul. 3, 2001], pp. 1-2, Retrieved from the Internet: http://www.cs.cmu.edu/web/Groups/AI/html/faqs/ai/fuzzy/part1/faq-doc-9.html.

"What is the Relationship Between Fuzzy Truth Values and Probabilities?" [online], Nov. 21, 1994 [retrieved on Jul. 3, 2001], pp. 1-2, Retrieved from the Internet: http://www.cs.cmu.edu/web/Groups/AI/html/faqs/ai/fuzzy/part1/faq-doc-10.html.

"Are There Fuzzy State Machines?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-11.html.

"What is Possibility Theory?" [online], Apr. 15, 1993 [retrieved on Jul. 3, 2001], Retrieved from the Internet: http://www.cs.cmu.edu/web/Groups/AI/html/faqs/ai/fuzzy/part1/faq-doc-12.html.

"Elkan's 'The Paraodxical Success of Fuzzy Logic' Paper" [online], [retrieved on Jul. 3, 2001], Retrieved from the internet: http://www.cs.cmu.edu/web/Groups/AI/html/faqs/ai/fuzzy/part1/faq-doc-21.html.

Responses to "The Paradoxical Success of Fuzzy Logic" [online], Aug. 3, 1993 [retrieved on Jul. 3, 2001], pp. 1-8, Retrieved from the Internet: ftp://ftp.cs.cmu.edu/user/ai/areas/fuzzy/doc/elkan/response.txt.

"Glossary" [online], [retrieved Jul. 3, 2001], Retrieved from the Internet: http://www.cs.cmu.edu/web/Groups/AI/html/faqs/ai/fuzzy/part1/faq-doc-22.html.

"What is Fuzzy Logic?" [online], Copyright 1996-2000 [retrieved on Jul. 3, 2001], Retrieved from the Internet: http://www.aptronix.com/fide/whatfuzzy.htm.

Clark, Timothy, "Data Access & Mining Tools" [online], Copyright 1997 [retrieved on Mar. 29, 2001], pp. 1-6, Retrieved from the Internet: http://idm.internet.com/idm/vol2/5/idm0397-quest.html.

Williams, Joseph, "DBMS Online" [online], Mar. 1997 [retrieved on Mar. 29, 2001], pp. 1-5, Retrieved from the Internet: http://www.dbmsmag.com/9703d08/html.

Gibbs, Mark, "Review: Level Five's Quest 2.5, Mar. 24, 1997" [online], Mar. 24, 1997 [retrieved on Mar. 29, 2001], pp. 1-3, Retrieved from the Internet: http://www.nwfusion.com/intranet/0324rev.html?nf.

Dyck, Timothy, "Close is Good Enough With Quest 2.5 Beta" [online], Jul. 1, 1997 [retrieved on Mar. 29, 2001], pp. 1-3, Retrieved from the Internet: http://www.zdnet.com/eweek/reviews/0714/14quest.html.

"How Search Engines Work" [online], Copyright 1996-2001 [retrieved on Mar. 29, 2001], pp. 1-2, Retrieved from the Internet: http://www.searchenginewatch.com/webmasters/work.html.

Zhang, Dell and Yisheng, Dong, "An Efficient Algorithm to Rank Web Resources" [online], [retrieved on Mar. 28, 2001], pp. 1-10, Retrieved from the Internet: http://www9.org/w9cdrom/251/251.html.

"Fuzzy Logic" [online], [retrieved on Mar. 28, 2001], pp. 1-4, Retrieved from the Internet: http://www.johnsboatstuff.com/Articles/fuzzy.htm.

"How Search Engines Rank Web Pages" [online], Copyright 1996-2001 [retrieved on Mar. 28, 2001], pp. 1-4, Retrieved from the Internet: http://www.searchenginewatch.com/webmasters/rank.html.

Perny, Patrice and Zucker, Jean-Daniel, "Collaborative Filtering Methods Based on Fuzzy Preference Relations," 1999, pp. 1-7, EUROFUSE-SIC '99, Budapest.

* cited by examiner

| Result Rankings | |
|---|---|
| Fuzzy Score | Data Value |
| 1 | $200,000 |
| 0.9615 | $190,000 |
| 0.95 | $225,000 |
| 0.93 | $235,000 |
| 0.9174 | $185,000 |
| 0.902 | $249,000 |
| 0.8943 | $252,000 |
| 0.8654 | $255,000 |
| 0.8 | $175,000 |
| 0.6618 | $265,000 |
| 0.5 | $150,000 |
| 0.45 | $275,000 |

| Fuzzy Score | Selling Price | Number of Rooms | Number of Baths |
|---|---|---|---|
| 1 | $150,000 | 3 | 2.5 |
| 0.81 | $170,000 | 2 | 2 |
| 1 | $195,000 | 3 | 4 |
| 1 | $200,000 | 3 | 3 |
| 0.692308 | $225,000 | 5 | 3.5 |
| 1 | $230,000 | 3 | 2 |
| 0.9 | $235,000 | 4 | 3 |
| 0.9 | $260,000 | 4 | 3 |
| 1 | $280,000 | 3 | 1.5 |

| Aggregate Fuzzy Score | Selling Price | Number of Rooms | Number of Baths |
|---|---|---|---|
| 2.140382 | $150,000 | 3 | 2.5 |
| 2.12 | $170,000 | 2 | 2 |
| 2.872973 | $195,000 | 3 | 4 |
| 3 | $200,000 | 3 | 3 |
| 2.581948 | $225,000 | 5 | 3.5 |
| 2.71 | $230,000 | 3 | 2 |
| 2.775676 | $235,000 | 4 | 3 |
| 2.35 | $260,000 | 4 | 3 |
| 1.958235 | $280,000 | 3 | 1.5 |

1100

| Selling Price | Number of Rooms | Number of Baths |
|---|---|---|
| $200,000 | 3 | 3 |
| $195,000 | 3 | 4 |
| $235,000 | 4 | 3 |
| $230,000 | 3 | 2 |
| $225,000 | 5 | 3.5 |
| $260,000 | 4 | 3 |
| $150,000 | 3 | 2.5 |
| $170,000 | 2 | 2 |
| $280,000 | 3 | 1.5 |

DATA RANKING WITH A LORENTZIAN FUZZY SCORE

CROSS-REFERENCE TO RELATED APPLICATIONS

This application is a continuation of application Ser. No. 09/952,518, filed Sep. 12, 2001 now U.S. Pat. No. 6,701,312. Each and every document, including patents and publications, cited herein is incorporated herein by reference in its entirety as though recited in full.

BACKGROUND OF THE INVENTION

1. Field of the Invention

The present invention relates to information retrieval in a data processing system. The present invention further relates to a method for searching a document database such as the Internet and ranking the results obtained from such a search.

2. Description of Related Art

A computer's logic is both its strength and its weakness; it can only perform what it is told to do. If an alarm clock is set to go off at 6:00 PM, it will go off at exactly that time, even if it was obviously meant to go off at 6:00 AM. People in the real world can solve problems and make decisions relatively easy, but even the simplest decisions are often too difficult to be handled by computer. Fuzzy logic query processing helps to bridge the gap.

Databases are strategic tools because they support business processes. In order for a database to be useful, data must be compiled into information using tools such as queries. Queries allow a user to specify what data to retrieve from a database, and in what form. Fuzzy querying provides a way to retrieve data that was intended to be retrieved, without requiring exact parameters to be defined.

Non-fuzzy query processing relies on Boolean logic, which limits results to true or false (1 or 0). Fuzzy query processing is a superset of Boolean logic that can handle partial truths. Instead of a search results being limited to return a value of true or false, the query returns values as x % true or x % a member of a subset.

Fuzzy queries rely on the use of fuzzy quantifiers. Dr. Lotfi A. Zadeh, the founder of fuzzy logic theory, defined two kinds of quantifiers: absolute and relative. An absolute quantifier can be represented as fuzzy subsets of the non-negative numbers and use words such as at least three or about five. Relative qualifiers are represented as fuzzy subsets of the unit interval and use words such as most, at least half, or almost all.

Fuzzy queries do not take the place of the more structured queries, but expand the alternatives available. Boolean systems use selection and then ordering as a mechanism, where a fuzzy system relies on a single mechanism of overall membership degree. A fuzzy system allows for compromise between the various criteria, where a Booleen system can produce a subset of previously selected elements. There are times when Booleen logic is too rigid to be meaningful to a user. A fuzzy query allows a user to find elements that satisfy a criterion and ranks the results.

FIG. 1 illustrates the typical flow of a fuzzy database query. After identifying the need for a report 100, the user queries a database 110. The database returns a record, which is matched against predefined criteria 120 to determine the degree to which a match has occurred. The degree is then compared to a threshold value 125 to determine whether the record satisfies the users query 130 or whether the record should be discarded 135. In general, a fuzzy database query differs from a non-fuzzy query by adding steps to match the data to predefined criteria and compare the value to a threshold specified in the query.

An object can be a member of multiple sets with a different degree of membership. The degree of membership is a scale from zero to one. Complete membership has a value of one, and no membership has a value of zero. When running a fuzzy query in a control system, the output is calculated based on the value of membership a given input has in the configured fuzzy sets. Each combination of sets is configured to have a specified output. The output is based on the weighted sum of the amount of membership in each set. The fuzzy models may be used in conjunction with probabilistic models to find a solution.

FIG. 2 shows the three transformations of the system inputs 200 to outputs 205 in a fuzzy system. The process of "fuzzification" 210 is a methodology to generalize any specific theory from a precise form to continuous form. It decomposes a system input or output into one or more fuzzy sets. After the decomposition into fuzzy sets, fuzzy rule association 215 applies a set of rules to a combination of inputs. The rules determine the action and relate the variable into a numeric value. Once the numeric value is determined, de-fuzzification 220 converts the fuzzy result into an exact output value.

For example, telling a driving student to apply the brakes 74 feet from the crosswalk is too precise to be followed. Vague wording like "apply the brakes soon", however, can be interpreted and acted upon. The instruction is received in a fuzzy form, the person associates the message using past experiences, then defuzzifies the message in order to actually apply the brakes at the appropriate time. Fuzzy queries expand query capabilities by allowing for ambiguity and partial membership.

SUMMARY OF THE INVENTION

The invention relates to database searching and the ranking of a set of numerical data according to a set of user specified preferences, including target range, fuzziness and bias.

In many database query applications, data records are returned when certain field data falls into a user specified target range. The introduction of fuzziness in the present invention extends the returned data set by including records that are "close" to the target range. The addition of a bias also increases the usefulness of the database query by providing a means to rank the results of the query in a specified order.

The present invention adapts the Lorentzian function to include variables for fuzziness and bias in order to calculate fuzzy scores, which are used to rank the results of database searches. In one embodiment, only a single input target range is used in the database query. In another embodiment, however, multiple query fields are used. According to another embodiment, when multiple query fields are used fuzzy scores are calculated for each query field in each record. The fuzzy scores of each query field in each record are then aggregated into a composite fuzzy score that is then used to rank the results of the database query.

Other features, advantages, and embodiments of the invention are set forth in part in the description that follows, and in part, will be obvious from this description, or may be learned from the practice of the invention.

BRIEF DESCRIPTION OF THE DRAWINGS

The foregoing and other features and advantages of this invention will become more apparent by reference to the following detailed description of the invention taken in conjunction with the accompanying drawings.

FIG. 9 shows a table of calculated fuzzy scores for each record based only on number of rooms.

FIG. 11 shows aggregate fuzzy scores for each record and ranked database records.

DETAILED DESCRIPTION OF THE PREFERRED EMBODIMENTS OF THE INVENTION

As embodied and broadly described herein, the preferred embodiments of the present invention are directed to a method for searching a document database such as the Internet according to a set of user specified preferences, including target range, fuzziness and bias and ranking the results obtained from such a search.

The basic building block of the fuzzy score is the Lorentzian function:

$$\frac{1}{1+\left[\frac{x-x0}{a}\right]^2}$$

Figure 1:
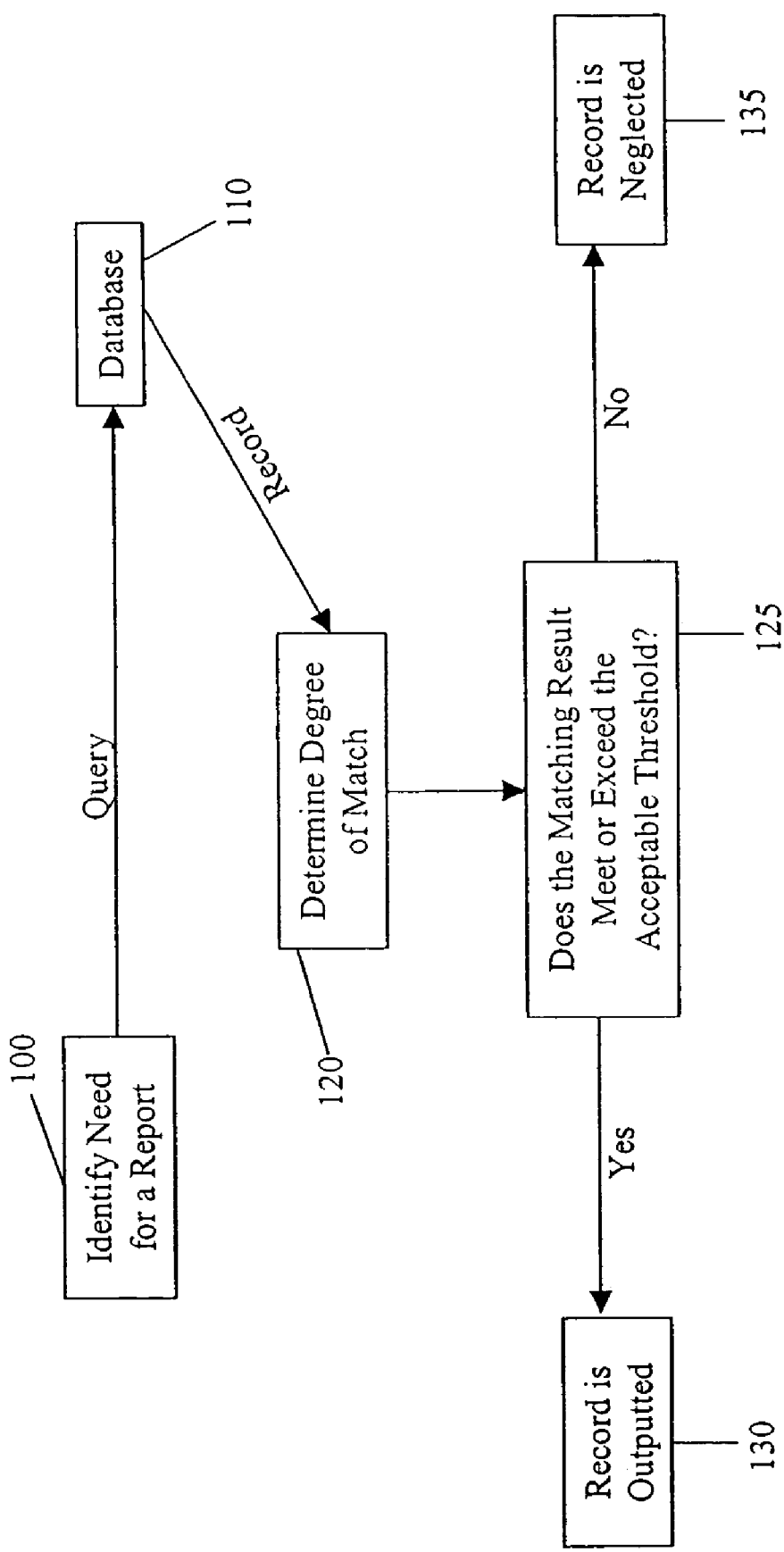
FIG. 1 shows the typical flow of a fuzzy database query.
Figure 2:
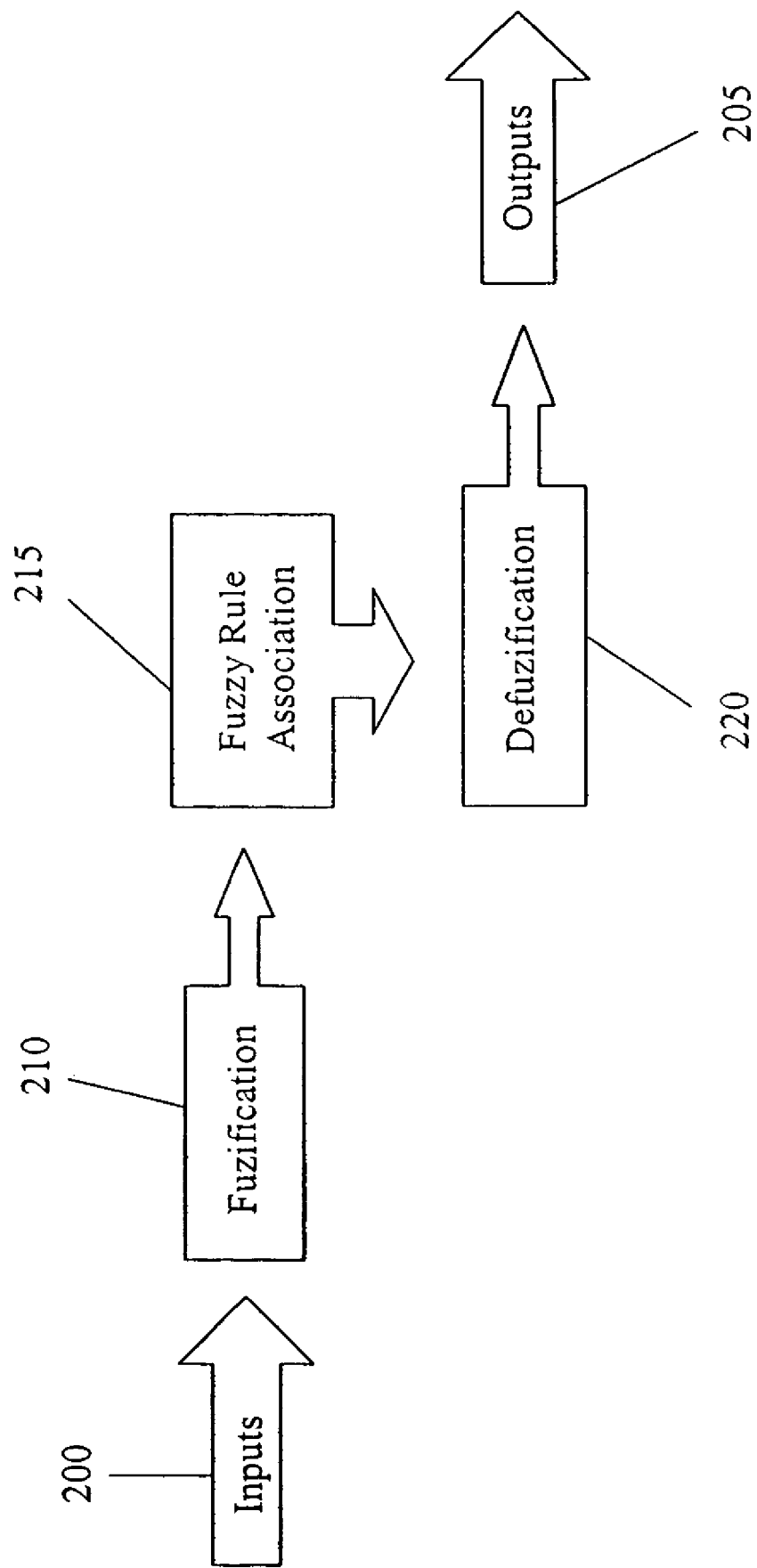
FIG. 2 depicts the three main transformations in a fuzzy system.
Figure 3:
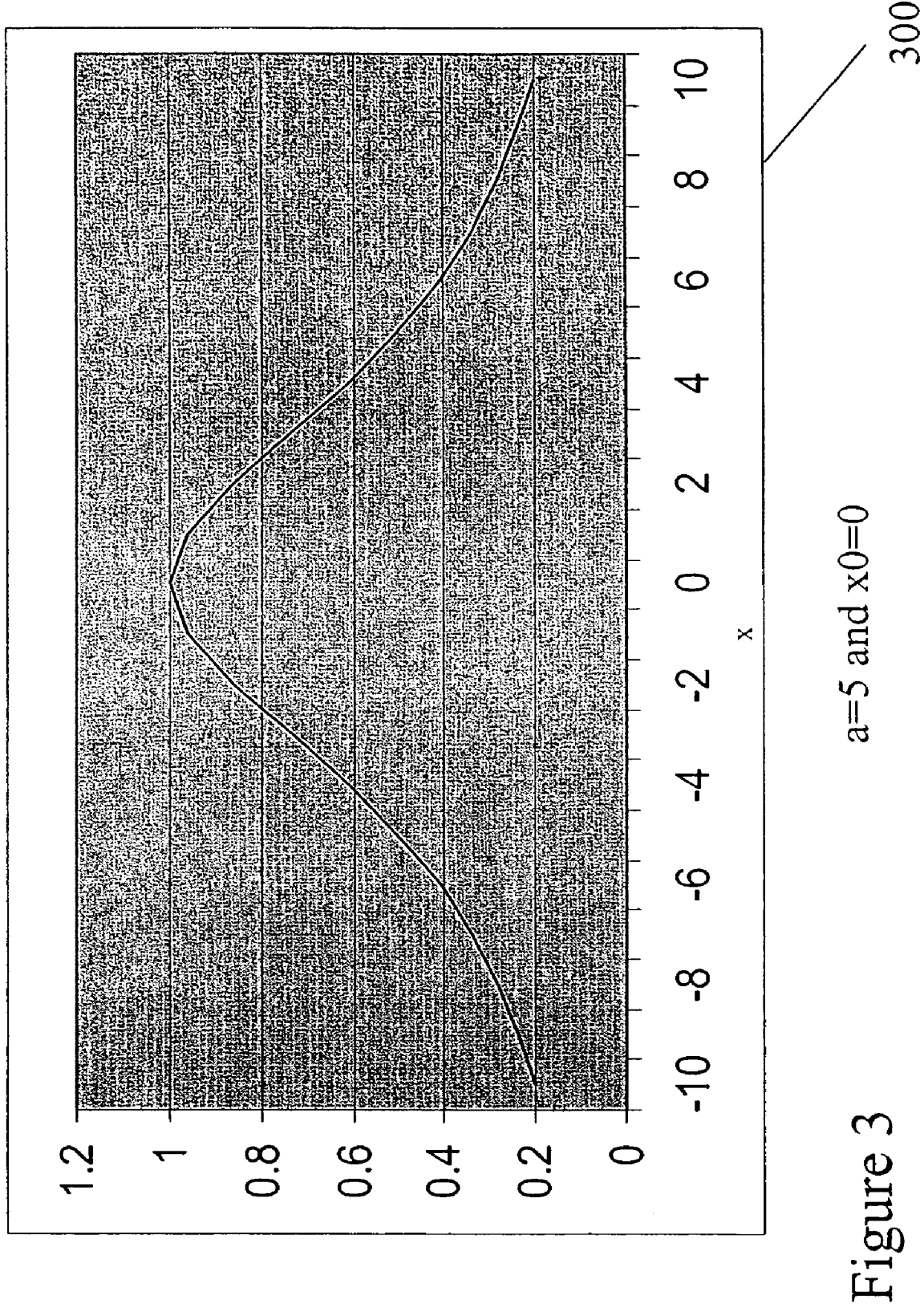
FIG. 3 shows a graph of the Lorentzian function.

As shown in FIG. 3, the Lorentzian function 300 has a bell-shaped drop off from a central peak. FIG. 3 depicts the Lorentzian function with $a=5$, $x0=0$, and x ranging from $-10$ to $10$. The fuzziness of the score is proportional to the width of the Lorentzian function. The bias is introduced by a linear variation within the target range.

The fuzzy score allows a user to rank a set of numerical data according to the user's input. The qualitative behavior of the Lorentzian fuzzy score is described as follows. For data that lies outside the target range, the score is zero without fuzziness and in the range [0,1] with fuzziness. For data that is inside the target range, the score varies linearly, with a bias (higher score) towards either the lower or upper bound of the target range.

The following notation and terminology is used throughout the specification:

| Name | Symbols | Notes |
| --- | --- | --- |
| Data Value | $x_1, x_2, \ldots, x_k$ | The maximal and minimal data values are $Max(x_k)$ and $Min(x_k)$, respectively |
| Target Range | $(x_{min}, x_{max})$ | $x_{max} \geq x_{min}$ |
| Bias | $\beta$ | $\beta$ may be greater or smaller than zero |
| Fuzzy Parameters | $a1 = \alpha 1 * \frac{\Delta}{2}$<br>$a2 = \alpha 2 * \frac{\Delta}{2}$ | $\Delta = Max(x_k) - Min(x_k)$ |
| Fuzziness or Closeness | $\alpha 1$ and $\alpha 2$ | $\alpha 1 \geq 0$ and $\alpha 2 \geq 0$ |

According to an embodiment of the present invention, the present invention can calculate a fuzzy score for a user defined database query and rank the results of the query. The fuzzy score is calculated based on user specified criteria including, but not limited to, target range ($x_{min}$, $x_{max}$), fuzziness ($\alpha 1$ and $\alpha 2$) and bias ($\beta$) In another embodiment, the fuzziness and/or bias is static and set by the software/system performing the search. While the parameters for fuzziness and bias are numeric, it is contemplated in at least one embodiment that these parameters be translated into more easily understood terminology for user selection. For example, instead of having a user specify a numeric value for each of the fuzziness parameters, $\alpha 1$ and $\alpha 2$, the user may select from a list of fuzziness categories (i.e. small, medium, large). The terms small, medium and large would equate to specific values of $\alpha 1$ and $\alpha 2$ and would be used to calculate a fuzzy score as described herein. The same holds true for the bias parameter, $\beta$. Instead of having a user specify a numeric bias value, the user may select from a list of bias categories (i.e. toward the lower bound, toward the upper bound). These categories would also be equated to specific numeric values and would be used to calculate a fuzzy score as described herein.

In order to illustrate the application of the Lorentzian function to calculate a fuzzy score, several examples will be given. Each example will illustrate how variations in user input parameters (i.e. target values, fuzziness, bias) affect the Lorentzian function as it is used to calculate a fuzzy score. For consistency, the examples will be based on a user who is shopping for a new home via a web site containing new home data. The web site allows the user to search a database of new homes based on the selling price of the home. For the following examples it is assumed the user is interested in houses between $200,000 and $250,000. Thus, the target range is defined as $x_{min}=200000$ and $x_{max}=250000$. In addition, the web site allows the user to input fuzziness values, $\alpha 1$ and $\alpha 2$, and a bias value, $\beta$.

For bias ($\beta$) values less than zero (i.e. biased toward the lower bound of the target range), the Lorentzian fuzzy score has the following formula:

For $\beta < 0$, $$S(x) = \begin{cases} \dfrac{1}{1+\left(\dfrac{x-x_{min}}{a1}\right)^2} & x < x_{min} \\ 1 + \dfrac{\beta * (x - x_{min})}{x_{max} - x_{min}} & x_{min} \leq x \leq x_{max} \\ \dfrac{1+\beta}{1+\left(\dfrac{x-x_{max}}{a2}\right)^2} & x_{max} < x \end{cases}$$

where x represents any data values, i.e., $x \in \{x_1, \ldots, x_k\}$.

Figure 4:
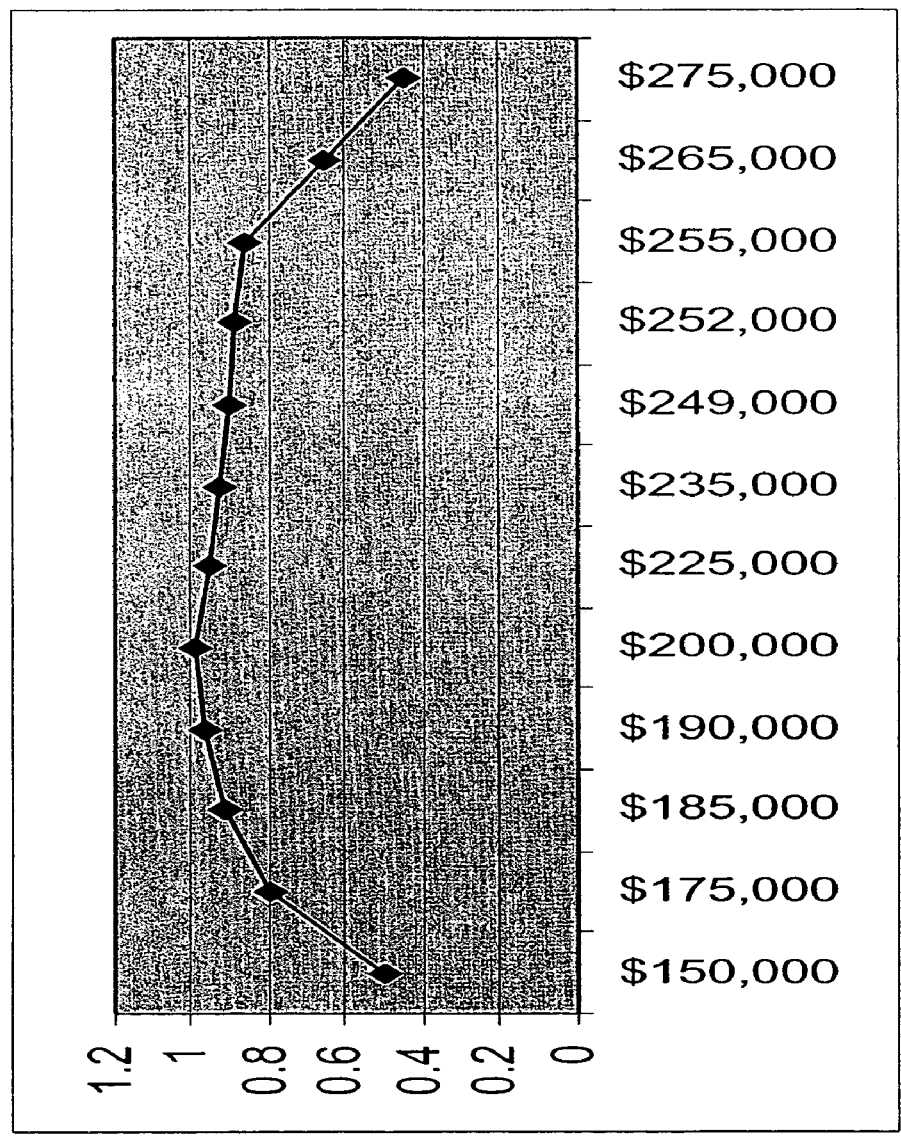
FIG. 4 shows calculated Lorentzian fuzzy scores where the bias is less than zero.

FIG. 4 shows a sample plot 400 of S(x) with $x_{min}$=200000, $x_{max}$=250000, α1=2, α2=1 and β=−0.1. The negative slope of the graph between the target values $200,000 and $250,000 is the result of the negative bias. The negative bias affects the fuzzy score calculated from data values between the target range by biasing those data values closer to the lower end of the target range. In addition, worth noting are the calculated fuzzy scores for the data points that lie outside the target range. The non-zero scores for those data points lying outside the target range are a direct result of the incorporation of the fuzziness parameters into the Lorentzian function. Consistent with the Lorentzian function is the rapid drop off of the fuzzy scores for the data points that lie farthest from the target range. In this example, and as illustrated in the table of result rankings 410, the query would have returned records for each of the 12 homes in the database. The addition of the fuzzy scores, however, makes it easy for the user to visualize the records that best conform to the original search parameters.

For bias (β) values greater than zero (i.e. biased toward the upper bound of the target range), the Lorentzian fuzzy score has the following formula:

For β>0, $$S(x) = \begin{cases} \dfrac{1-\beta}{1+\left(\frac{x-x_{min}}{a1}\right)^2} & x < x_{min} \\ 1 + \dfrac{\beta*(x-x_{max})}{x_{max}-x_{min}} & x_{min} \leq x \leq x_{max} \\ \dfrac{1}{1+\left(\frac{x-x_{max}}{a2}\right)^2} & x_{max} < x \end{cases}$$

where x represents any data values, i.e., $x \in \{x_1, \ldots, x_k\}$.

Figure 5:
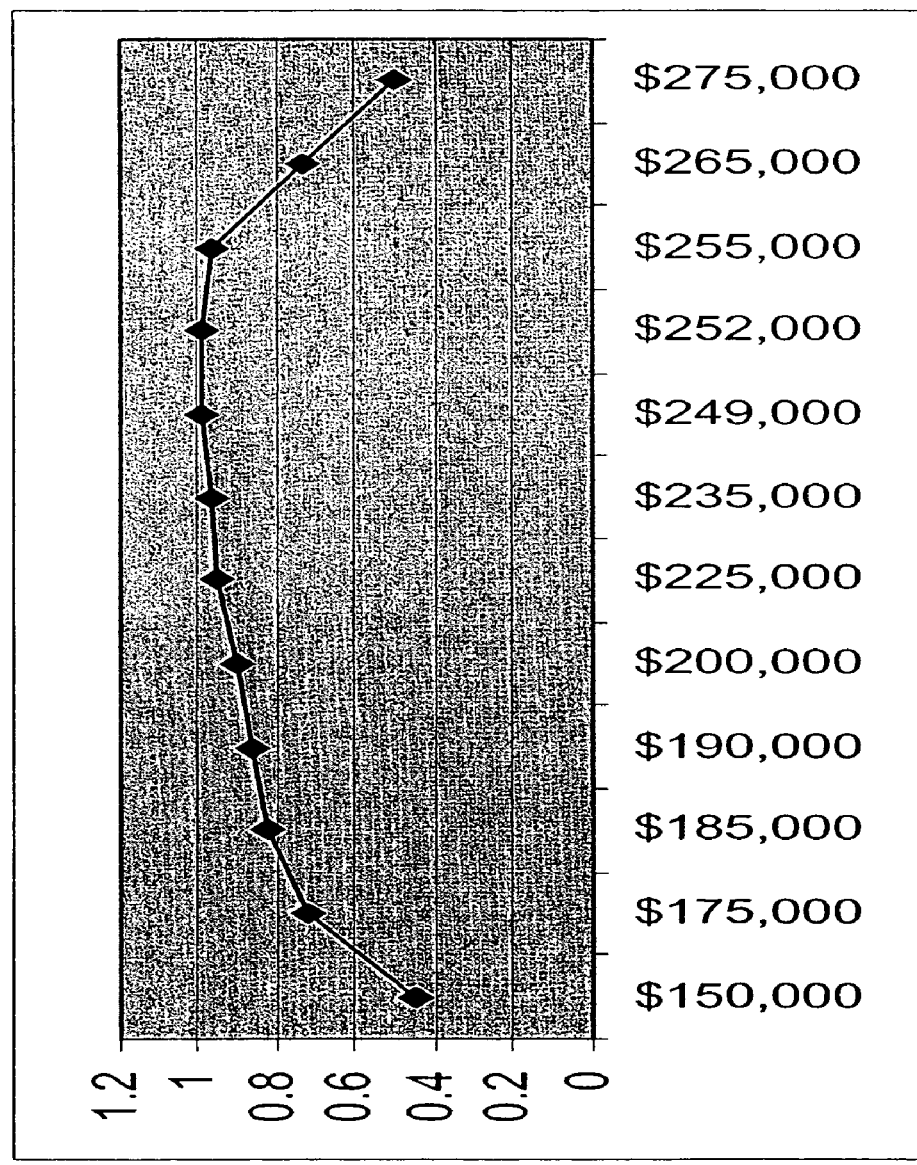
FIG. 5 shows calculated Lorentzian fuzzy scores where the bias is greater than zero.

FIG. 5 shows a sample plot 500 of S(x) with $x_{min}$=200000, $x_{max}$=250000, α1=2, α2=1, and β=0.1. The positive slope of the graph between the target values $200,000 and $250,000 is the result of the positive bias. The positive bias affects the fuzzy score calculated from data values between the target range by biasing those data values closer to the upper end of the target range. In addition, worth noting are the calculated fuzzy scores for the data points that lie outside the target range. The non-zero scores for those data points lying outside the target range are a direct result of the incorporation of the fuzziness parameters into the Lorentzian function. Consistent with the Lorentzian function is the rapid drop off of the fuzzy scores for the data points that lie farthest from the target range. In this example, and as illustrated in the table of result rankings 510, the query would have returned records for each of the 12 homes in the database. The addition of the fuzzy scores, however, makes it easy for the user to visualize the records that best conform to the original search parameters.

In the case of no fuzziness, α1=0, α2=0, and where the bias (β) value is less than zero (i.e. biased toward the lower bound of the target range), the Lorentzian fuzzy score has the following formula:

For β<0, α1=0, and α2=0, $$S(x) = \begin{cases} 0 & x < x_{min} \\ 1 + \dfrac{\beta*(x-x_{min})}{x_{max}-x_{min}} & x_{min} \leq x \leq x_{max} \\ 0 & x_{max} < x \end{cases}$$

where x represents any data values, i.e., $x \in \{x_1, \ldots, x_k\}$.

In the case of no fuzziness, α1=0, α2=0, and where the bias (β) value is greater than zero (i.e. biased toward the upper bound of the target range), the Lorentzian fuzzy score has the following formula:

For β>0, α1=0, and α2=0, $$S(x) = \begin{cases} 0 & x < x_{min} \\ 1 + \dfrac{\beta*(x-x_{max})}{x_{max}-x_{min}} & x_{min} \leq x \leq x_{max} \\ 0 & x_{max} < x \end{cases}$$

where x represents any data values, i.e., $x \in \{x_1, \ldots, x_k\}$.

Figure 6:
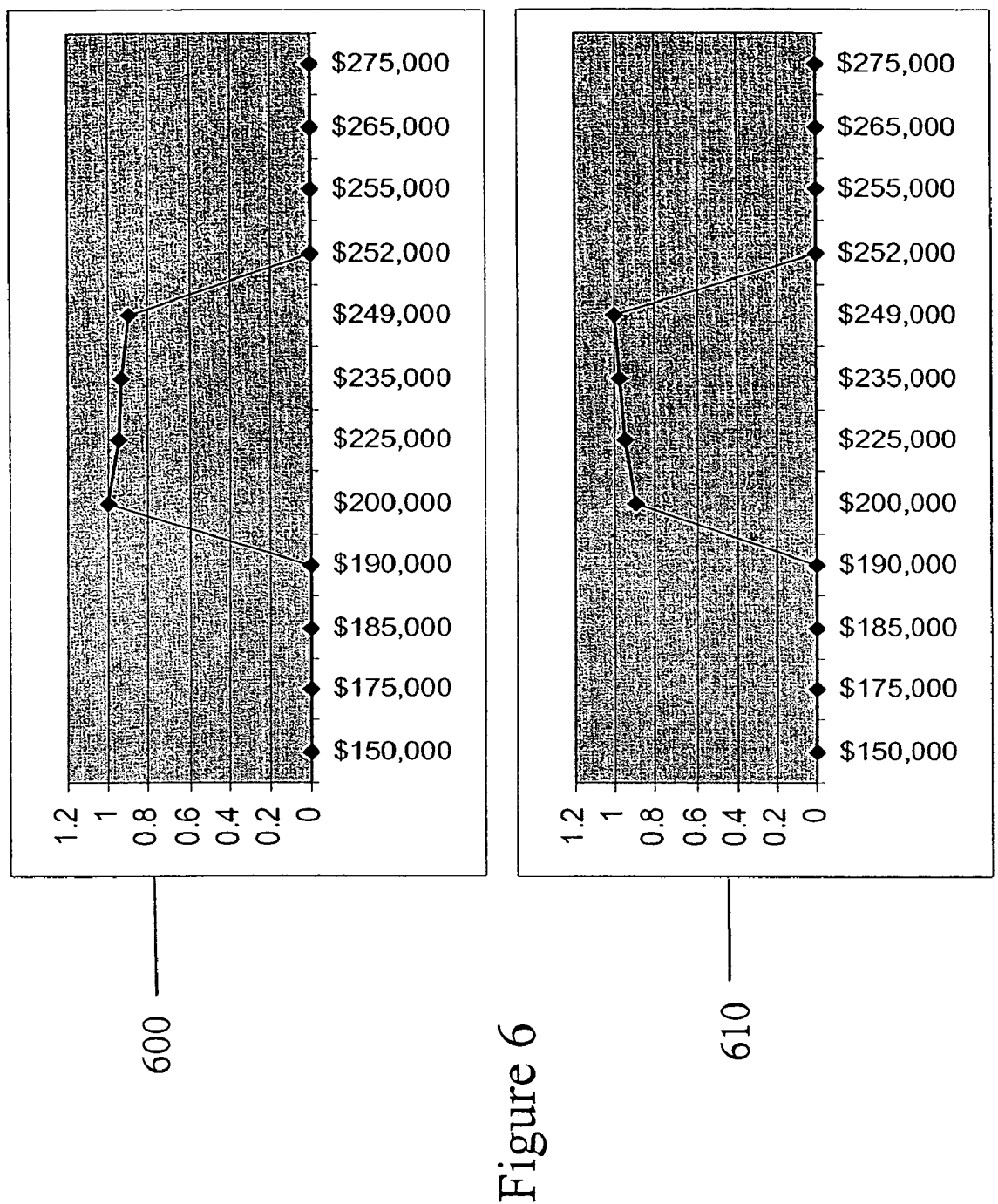
FIG. 6 shows two graphs of calculated Lorentzian fuzzy scores where the fuzziness parameters are set to zero (i.e. there is no fuzziness).

FIG. 6 shows a sample plot 600 of S(x) with $x_{min}$=200000, $x_{max}$=250000, α1=0, α2=0, and β=−0.1. FIG. 6 also shows another sample plot 610 of S(x) with $x_{min}$=200000, $x_{max}$=250000, α1=0, α2=0, and β=0.1. As with plots 400 and 500, plots 600 and 610 illustrate the effect a negative and positive bias have on the calculated fuzzy scores. As previously stated, a negative bias results in the negative slope of the plot 600 between the target values, while a positive bias results in the positive slope of the plot 610 between the target values. Since the fuzziness parameters, α1 and α2, were set to zero in both plot 600 and plot 610, all data values lying outside of the user defined target range are given a fuzzy score of zero. While the same query produced 12 records with fuzziness (as illustrated in FIGS. 4 and 5), without fuzziness only 4 records are retrieved. Moreover, records that would probably be of interest to the user, i.e. the $252,000 home, are never retrieved when the query does not incorporate the fuzziness parameters.

In the special case where the target range degenerates into a single value (i.e. $x_{min}=x_{max}=\underline{x}$) and where the bias (β) value is less than zero (i.e. biased toward the lower bound of the target range), the Lorentzian fuzzy score has the following formula:

For β<0 and $x_{min}=x_{max}=\underline{x}$, $$S(x) = \begin{cases} \dfrac{1}{1+\left(\frac{x-\underline{x}}{a1}\right)^2} & x < \underline{x} \\ 1 & x = \underline{x} \\ \dfrac{1+\beta}{1+\left(\frac{x-\underline{x}}{a2}\right)^2} & x > \underline{x} \end{cases}$$

where x represents any data values, i.e., $x \in \{x_1, \ldots, x_k\}$.

In the special case where the target range degenerates into a single value (i.e. $x_{min}=x_{max}=\underline{x}$) and where the bias (β) value is greater than zero (i.e. biased toward the upper bound of the target range), the Lorentzian fuzzy score has the following formula:

For β>0 and $x_{min}=x_{max}=\underline{x}$, $$S(x) = \begin{cases} \dfrac{1-\beta}{1+\left(\frac{x-\underline{x}}{a1}\right)^2} & x < \underline{x} \\ 1 & x = \underline{x} \\ \dfrac{1}{1+\left(\frac{x-\underline{x}}{a2}\right)^2} & x > \underline{x} \end{cases}$$

where x represents any data values, i.e., $x \in \{x_1, \ldots, x_k\}$.

Figure 7:
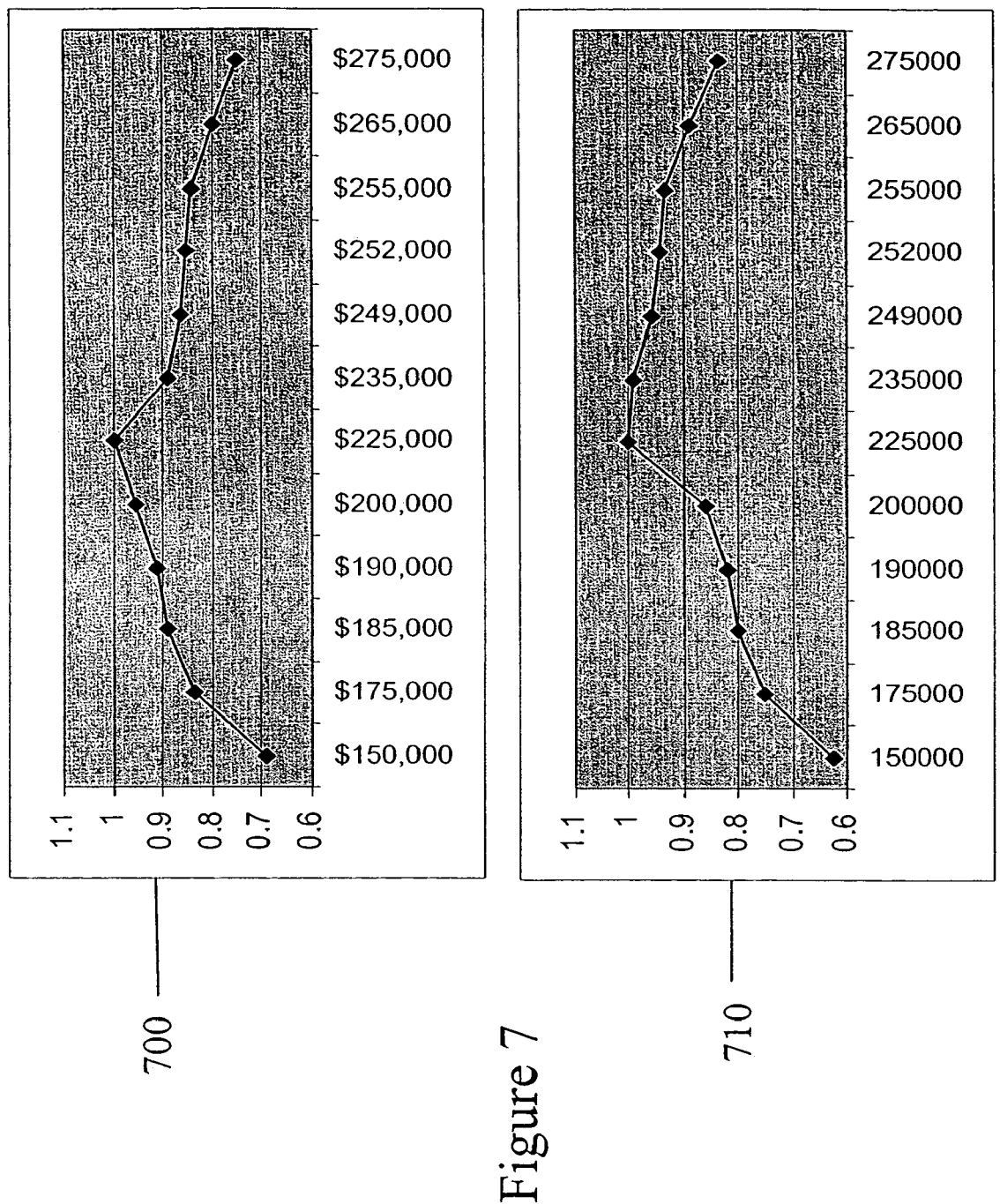
FIG. 7 shows two graphs of calculated Lorentzian fuzzy scores in the special case where the target range degenerates into a single value.

FIG. 7 shows a sample plot 700 of S(x) with $\underline{x}$=225000, α1=1, α2=1, and β=−0.1. FIG. 7 also shows another sample plot 710 of S(x) with $\underline{x}$=225000, α1=1, α2=1, and β=0.1. The affect of the bias in plot 700 and 710 is more difficult to discern since there is no target range. However, a close inspection of plot 700 shows that the negative bias does influence the calculated fuzzy scores for those data values less than the target value and in plot 710 that the positive bias does influence the calculated fuzzy scores for those data values greater than then target value.

While each of the above examples has dealt with single term queries (i.e. where the user is searching based only on the selling price, of a home), the present invention is easily extended to include queries with multiple search terms. To illustrate how the Lorentzian function can be used in a multiple-field query a more sophisticated home buying example is explored. The home buying database in this example is on the Internet and the user is given the option to search for new homes based on selling price, number of rooms, and number of baths. For this example, it is assumed the database contains the following records:

| Selling Price | $150,000 | $170,000 | $195,000 | $200,000 | $225,000 | $230,000 | $235,000 | $260,000 | $280,000 |
|---|---|---|---|---|---|---|---|---|---|
| Number of Rooms | 3 | 2 | 3 | 3 | 5 | 3 | 4 | 4 | 3 |
| Number of Baths | 2.5 | 2 | 4 | 3 | 3.5 | 2 | 3 | 3 | 1.5 |

It is further assumed that the user has entered the following query:

| | | | |
|---|---|---|---|
| Selling Price: | $200,000–$230,000 | Bias: | Lower Priced Homes |
| Number of Rooms: | 3 | Bias: | More Rooms |
| Number of Baths: | 3 | Bias: | More Baths |
| Fuzziness: | Medium | | |

As previously discussed, and as illustrated here, the database or search tool/engine may be set up to allow the user to input non-numeric bias and fuzziness then equated to specific numeric parameters by the database application, search tool/engine or other system/software. For this example, the following non-numeric user specified bias parameters are equated to the following numeric parameters: Bias Lower Priced Homes=−0.1, More Rooms=0.1, More Baths=0.1. In addition, for this example, the following non-numeric specified fuzziness parameter is equated to the following numeric parameters: Medium→α1=2, α2=2. While the user, in this example, was only allowed to enter a single fuzziness parameter for the entire query, it is contemplated in another embodiment that each query field (i.e. selling price, number of rooms, number of baths) could have its own separate fuzziness parameter.

The process for searching the database and ranking the results of the query is straightforward. First, a fuzzy score is calculated for each query field and for each record using the appropriate Lorentzian formula. Second, an aggregate fuzzy score is calculated for each record using the fuzzy scores for each query field. Finally, the results are ranked according to the aggregate calculated fuzzy scores for each record.

Figure 8:
FIG. 8 shows a table of calculated fuzzy scores for each record based only on selling price.

FIG. 8 shows the fuzzy score 800 for each record based only on selling price. Since the user has specified a bias toward the lower bound of the target range (as indicated by the user's desire for lower priced homes), the following Lorentzian fuzzy score formula is used:

For β<0, $$S(x) = \begin{cases} \dfrac{1}{1+\left(\dfrac{x-x_{min}}{a1}\right)^2} & x < x_{min} \\[2ex] 1 + \dfrac{\beta*(x-x_{min})}{x_{max}-x_{min}} & x_{min} \le x \le x_{max} \\[2ex] \dfrac{1+\beta}{1+\left(\dfrac{x-x_{max}}{a2}\right)^2} & x_{max} < x \end{cases}$$

where x represents any data values, i.e., x∈{$x_1$, ..., $x_k$}, $x_{min}$=200000, $x_{max}$=230000, α1=2, α2=2, and β=−0.1.

FIG. 9 shows the fuzzy score 900 for each record based only on number of rooms. Since the user has specified a bias toward the upper bound of the target range (as indicated by the user's desire for more rooms), the following Lorentzian fuzzy score formula is used:

For β>0 and $x_{min}$=$x_{max}$=$\underline{x}$, $$S(x) = \begin{cases} \dfrac{1-\beta}{1+\left(\dfrac{x-\underline{x}}{a1}\right)^2} & x < \underline{x} \\[2ex] 1 & x = \underline{x} \\[2ex] \dfrac{1}{1+\left(\dfrac{x-\underline{x}}{a2}\right)^2} & x > \underline{x} \end{cases}$$

where x represents any data values, i.e., xδ∈{$x_1$, ..., $x_k$}, $\underline{x}$=3, α1=2, α2=2, and β=0.1.

Figure 10:
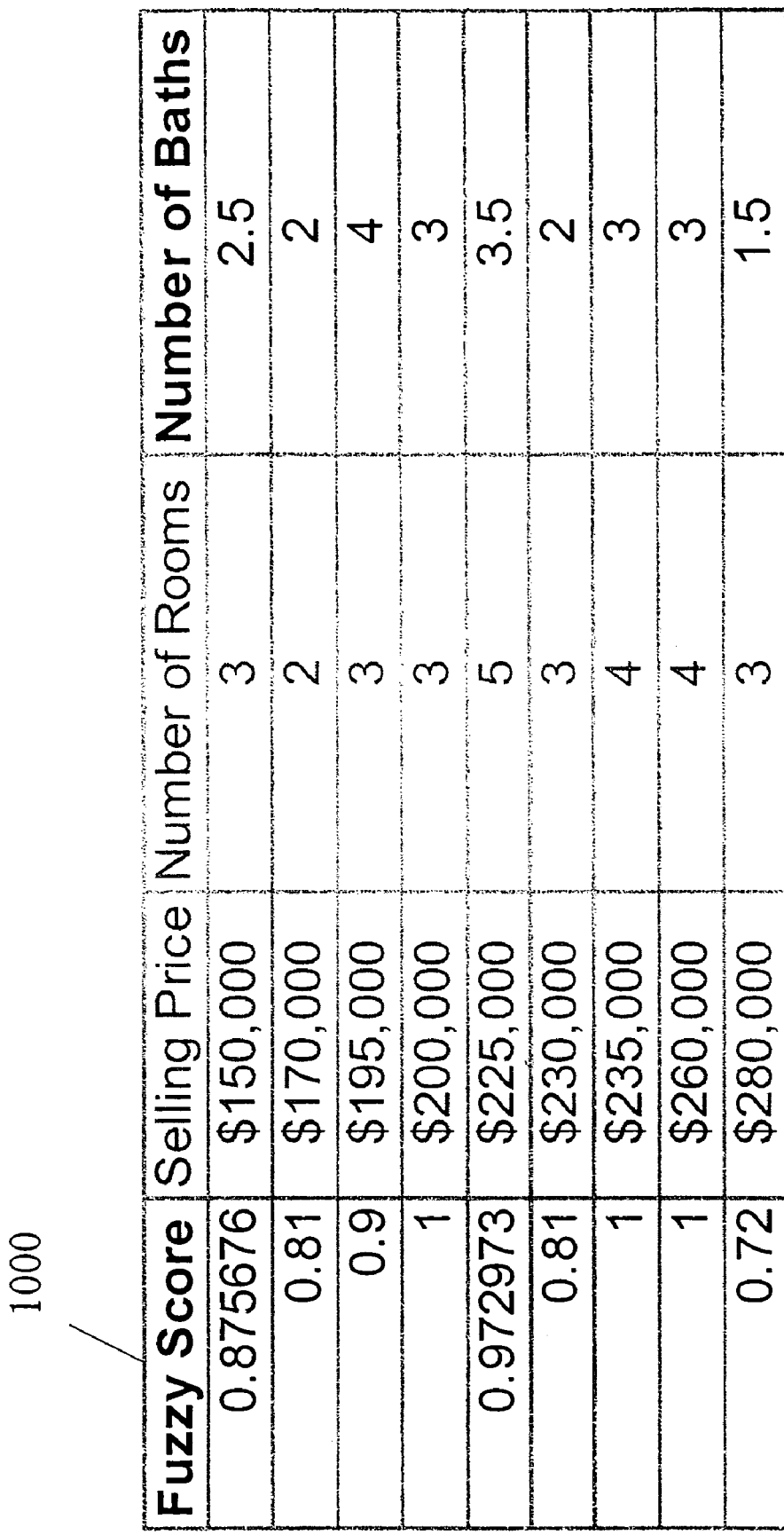
FIG. 10 shows a table of calculated fuzzy scores for each record based only on number of baths.

FIG. 10 shows the fuzzy score 1000 for each record based only on number of baths. Since the user has specified a bias toward the upper bound of the target range (as indicated by the user's desire for more baths), and since a single target value is also specified, the same Lorentzian fuzzy score formula used to calculate the fuzzy scores for each record based on number of rooms is used.

Once a fuzzy score is calculated for each query field for each record, an aggreagate fuzzy score is calculated for each record. In one embodiment, this is accomplished by simply adding the fuzzy scores of each query field together. In another embodiment, an aggregate fuzzy score is calculated by using a weighted sum. By using a weighted sum the results of a specific query field(s) can be given more weight. For example, a user may consider the selling price of a home more important than any of the other query fields. In order to incorporate this into the ranking methodology, the fuzzy scores calculated based only on the selling price of the home are multiplied by some factor so that the selling price of the home has more influence on the aggregate fuzzy scores.

The aggregate fuzzy scores 1100 for each record in this example are shown in FIG. 11. In this example the fuzzy scores of each query field have simply been added together. Once the aggregate fuzzy scores are calculated, the database records are ranked according to aggregate fuzzy score. The ranked database records 1110 are also shown in FIG. 11. With the homes ranked, the user can easily identify those homes that best match the user's query.

As would be expected based on the input query, the home selling for $200,000 with 3 rooms and 3 baths is ranked the highest. While a traditional database search would not have retrieved any records outside the user's input target range of $200,000-$230,000, 3 rooms and 3 baths, the present invention has returned all 9 records. Worth noting is the home selling for $195,000 with 3 rooms and 4 baths and the home selling for $235,000 with 4 rooms and 3 baths. Both of these homes would not have been included within the search results in a traditional database search, but in the present invention are ranked high due to the incorporation of the fuzziness parameters in the Lorentzian fuzzy score formulas.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method for ranking a plurality of elements, wherein a numerical parameter characterizes each element, the method comprising:
    ranking a plurality of elements based at least in part on a Lorenizian fuzzy score based at least in part on a numerical parameter characterizing each element.

2. The method of claim 1, further comprising, prior to ranking:
    receiving an indication of at least one of fuzziness and bias as inputs to ranking.

3. The method of claim 2 wherein at least one indication is qualitative.

4. The method of claim 3 wherein each qualitative indication is mapped to a quantitative indication.

5. The method of claim 2 wherein at least one indication is quantitative.

6. A method for ranking a plurality of elements, wherein a plurality of numerical parameters characterizes each element, the method comprising:
    ranking a plurality of elements based at least in part on an aggregate score;
        the aggregate score based at least in part on a plurality of Lorentzian fuzzy scores;
            each Lorentzian fuzzy score based at least in part on a numerical parameter characterizing each element.

7. The method of claim 6, further comprising, prior to ranking:
    receiving an indication of at least one of fuzziness and bias as inputs to ranking.

8. The method of claim 7 wherein at least one indication is qualitative.

9. The method of claim 8 wherein each qualitative indication is mapped to a quantitative indication.

10. The method of claim 7 wherein at least one indication is quantitative.

11. The method of claim 6 wherein the aggregate score is basal at least in part on summing the Lorentzian fuzzy scores.

12. The method of claim 6 wherein the aggregate score is based at least in part on weighted summing of the Lorentzian fuzzy scores.

13. The method of claim 12 further comprising:
    prior to ranking, receiving an indication of weight for at least one parameter.

* * * * *

UNITED STATES PATENT AND TRADEMARK OFFICE
CERTIFICATE OF CORRECTION

| | |
|---|---|
| PATENT NO. | : 7,257,586 B2 |
| APPLICATION NO. | : 10/745552 |
| DATED | : August 14, 2007 |
| INVENTOR(S) | : Yun-Tung Lau and Marton Nagy |

It is certified that error appears in the above-identified patent and that said Letters Patent is hereby corrected as shown below:

TITLE PAGE IN THE INVENTORS ITEM (75) -

Please change "Yun-Tung Lau, Bethseda, MD (US);" to -- Yun-Tung Lau, Bethesda, MD (US); --

In the Cover Page of the Patent, Column 2, Line 1 of the First Reference under "Other Publications," please change ""Fuzzy Logic" [online], Copyright 199 [retrieved on Jul. 3, 2001]," to -- "Fuzzy Logic" [online], Copyright 1999 [retrieved on Jul. 3, 2001], --

In Column 9, Line 40, please change "Lorenizian fuzzy score based at least in part on a" to -- Lorentzian fuzzy score based at least in part on a --

In Column 10, Line 32, please change "basal at least in part on summing the Lorentzian fuzzy" to -- based at least in part on summing the Lorentzian fuzzy --

Signed and Sealed this

Thirteenth Day of November, 2007

JON W. DUDAS
*Director of the United States Patent and Trademark Office*